No. 667,908. Patented Feb. 12, 1901.
W. A. HATCHER.
SPEED REGULATOR FOR EXPLOSIVE ENGINES.
(Application filed Jan. 16, 1900.)
(No Model.) 3 Sheets—Sheet 1.
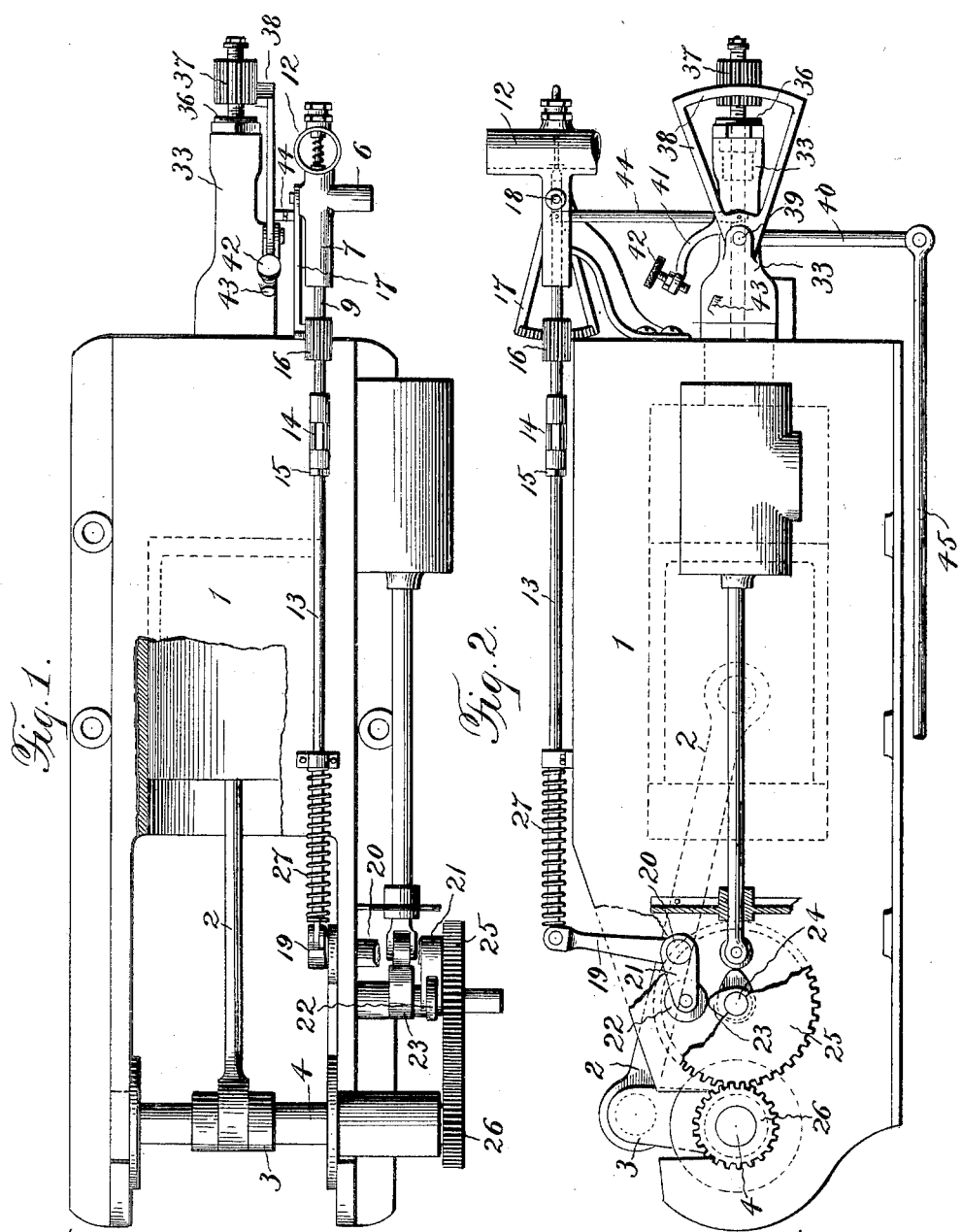
Witnesses:
Jas. E. Hutchinson
E. W. Clement
Inventor.
W. A. Hatcher
By Watson & Watson
Attorneys No. 667,908. Patented Feb. 12, 1901.
W. A. HATCHER.
SPEED REGULATOR FOR EXPLOSIVE ENGINES.
(Application filed Jan. 16, 1900.)
(No Model.) 3 Sheets—Sheet 2.
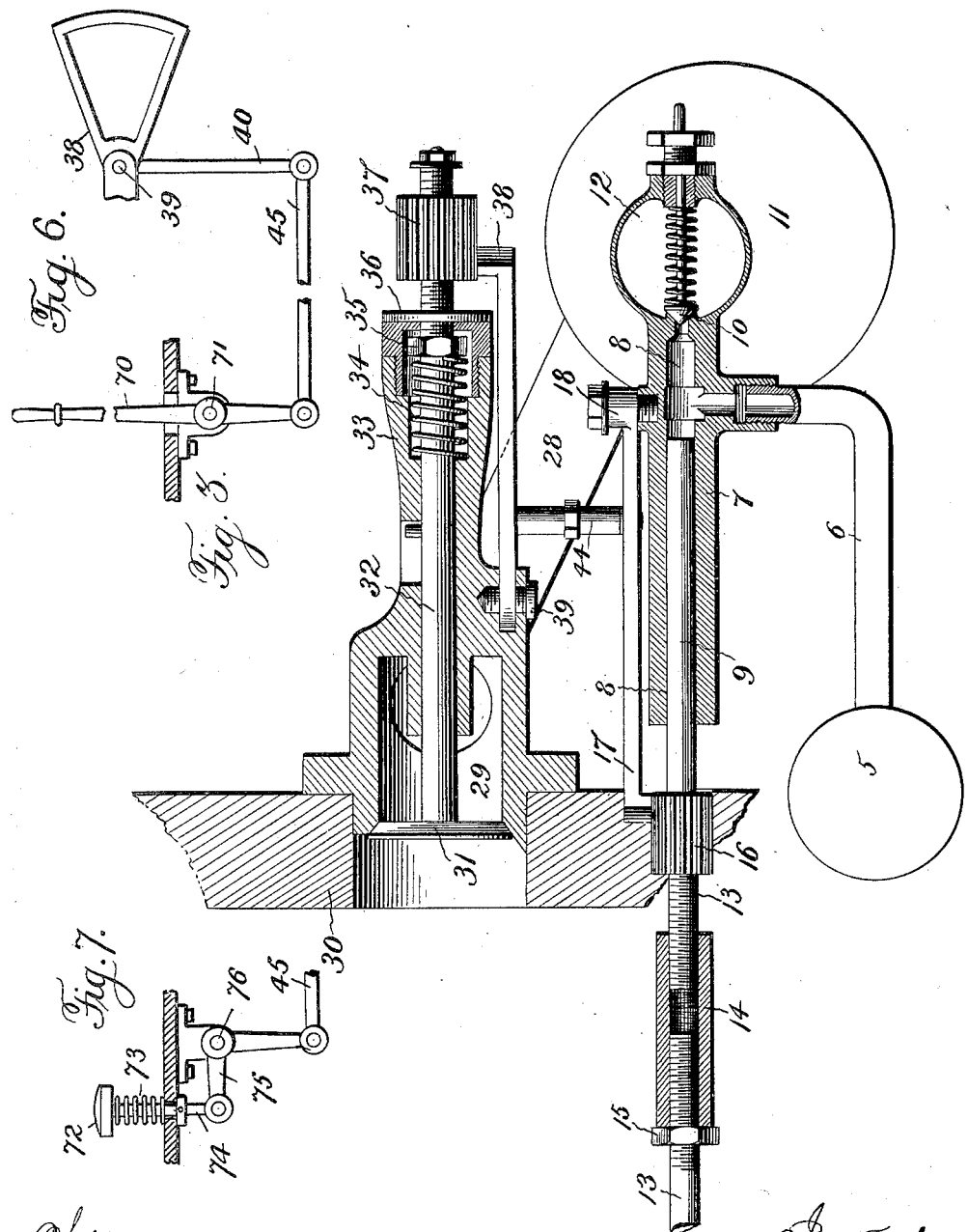

No. 667,908. Patented Feb. 12, 1901.
W. A. HATCHER.
SPEED REGULATOR FOR EXPLOSIVE ENGINES.
(Application filed Jan. 16, 1900.)
(No Model.) 3 Sheets—Sheet 3.
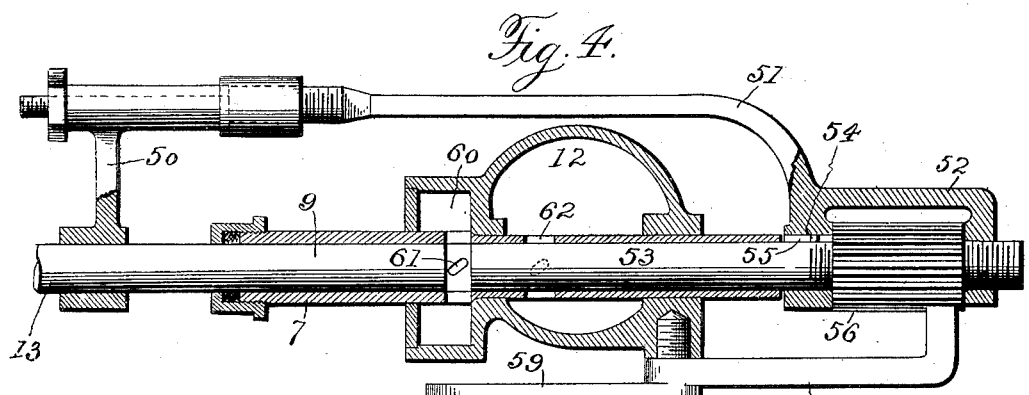
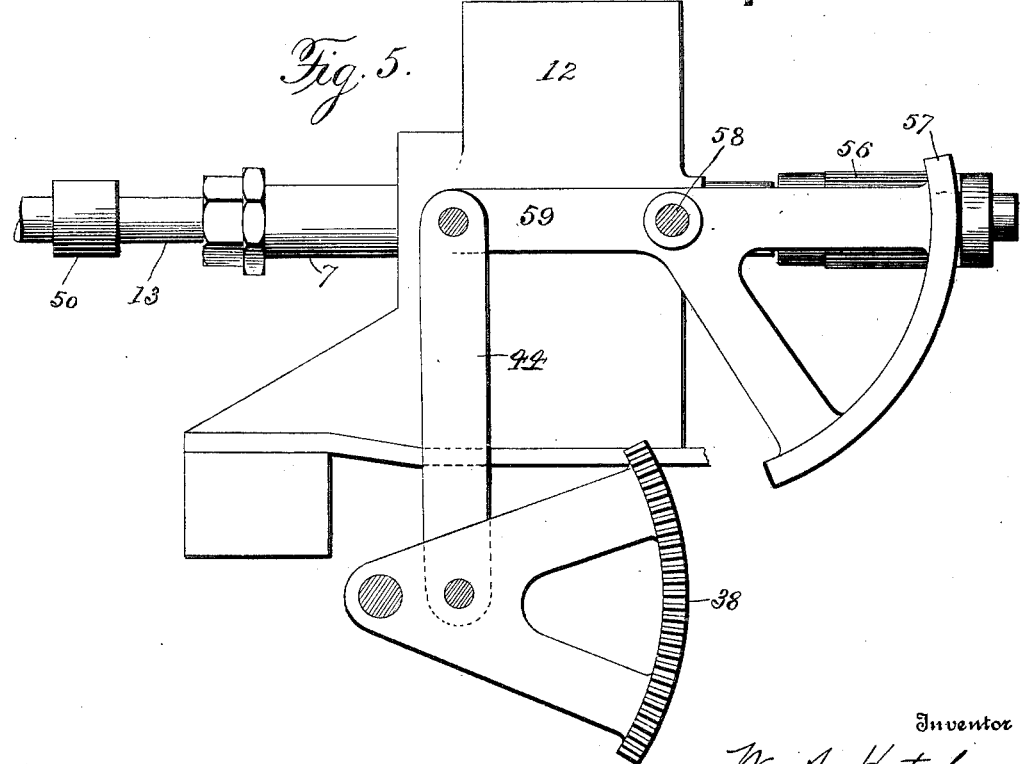
Witnesses
Jas. E. Hutchinson.
C. W. Clement.
Inventor
W. A. Hatcher
By Watson & Watson
Attorneys

UNITED STATES PATENT OFFICE.

WILLIAM A. HATCHER, OF WARREN, OHIO, ASSIGNOR TO JAMES W. PACKARD, OF SAME PLACE.

SPEED-REGULATOR FOR EXPLOSIVE-ENGINES.

SPECIFICATION forming part of Letters Patent No. 667,908, dated February 12, 1901.

Application filed January 16, 1900. Serial No. 1,666. (No model.)

*To all whom it may concern:*

Be it known that I, WILLIAM A. HATCHER, a citizen of the United States, residing at No. 2 High street, Warren, in the county of Trumbull and State of Ohio, have invented certain new and useful Improvements in Hydrocarbon-Motors, of which the following is a specification.

This invention comprises devices for regulating the speed and power of explosive-engines, and is particularly designed for use on motor-carriages, which require the speed and power of the engine to be under easy and constant control of the motorman.

In the accompanying drawings, forming part of this specification, Figure 1 is a plan view, and Fig. 2 a side elevation, of so much of a hydrocarbon-engine as is necessary to illustrate the present invention, parts being broken away. Fig. 3 is a section through the pump and inlet-valves. Fig. 4 is a plan view in section. Fig. 5 is a side view showing a different form of pump. Fig. 6 illustrates a means of operating the speed-controller by hand-power, and Fig. 7 illustrates a means of controlling the same by foot-power.

Referring to the drawings, 1 indicates the cylinder, 2 the connecting-rod, 3 the crank, and 4 the crank-shaft, of a hydrocarbon-engine using, for instance, gasolene. The gasolene is contained in a suitable tank 5, from which it passes through a pipe 6 to the pump 7 by gravity. The pump-barrel has a cylindrical opening 8, in which works a piston 9, which measures the amount of each charge of gasolene and forces the same through a spring-pressed valve 10 into a mixing-chamber 11. As the piston 9 moves forward it closes the inlet from pipe 6, and thereafter the liquid in the forward end of the barrel 8 is forced into the air-tube 12, leading to the mixer 11, during the balance of the forward stroke of the piston 9. By regulating the amount of stroke of the piston beyond the pipe 6 the charge of hydrocarbon is correspondingly regulated. The piston-rod 13 is formed in two parts, which are united by right and left screw-threads and a right-and-left nut 14. The nut 14 is rigidly connected to the piston-rod proper by a lock-nut 15, while the piston 9 is free to be turned into and out of the right-and-left nut to shorten and lengthen the distance it travels past the inlet from pipe 6. The piston is turned by an elongated pinion 16, which is fast upon it and which meshes with a sector-gear 17, pivoted at 18 and operated in a manner to be presently described. The piston-rod 13 is reciprocated in one direction by arm 19, rock-shaft 20, arm 21, cam-roll 22, and cam 23 on the short shaft 24, which is driven by a gear 25, meshing with a pinion 26 on the crank-shaft 4. The gear 25 has twice as many teeth as the pinion 26 and rotates one-half as fast as the crank-shaft. Rod 13 is reciprocated in the opposite direction by spring 27.

From the mixer 11 the explosive mixture is drawn through a pipe 28 to a chamber 29, connected to the head 30 of the cylinder, and is thence drawn in through a valve 31 to the cylinder during the forward movement of the piston. The valve-rod 32 extends back through a stuffing-box 33, and the valve is normally closed by a spring 34, which encircles the rod and bears upon the nut 35 upon said rod. On the end of the stuffing-box is a cap 36, through which the valve-rod passes. The end of the rod is threaded, and an internally-threaded pinion 37, having elongated teeth, turns thereon. When the valve is opened, the pinion 37 strikes the cap 36 and limits the opening. By regulating the position of the pinion 37 the opening of the valve and the amount of explosive mixture drawn into the cylinder may thus be controlled. The position of pinion 37 is controlled by a sector-gear 38, which is pivoted at 39 and which carries an arm 40, by means of which it is operated, and a second arm 41, which limits its movement in one direction. The arm 41 carries an adjustable stop 42, which coöperates with an abutment 43 upon the valve-chamber 33.

It is important to regulate the amount of gasolene admitted to the mixing-chamber in accordance with the amount of mixture admitted to the cylinder, so that the same proportion of air and gasolene may exist in the mixture at all times. To accomplish this, the controller of the gasolene-pump is connected with the controller of the inlet-valve 31. As shown, this is effected by connecting the sector-gears 17 and 38 by link 44. Any movement of the arm 40 is thereby communicated simultaneously to the elongated pinions 16 and 37, and the charge of gasolene is increased or diminished as the opening of the valve 31 is increased or diminished. The amount of air taken into the mixer is of course proportional to the amount of mixture admitted by the valve 31. The arm 40 is connected by a rod 45 to a hand-lever 70, pivotally connected at 71 to the forward part of the vehicle. By moving the hand-lever back and forth the amount of hydrocarbon delivered to the engine at each stroke may be varied at the will of the operator and the speed and power of the engine correspondingly varied. In Fig. 7 is shown means of operating the controlling devices by foot-power. This consists of a bolt 72, which is normally held in an elevated position by a spring 73. The lower end of the bolt is connected by a link 74 to one arm of an elbow-lever 75, which is pivoted at 76. The other arm of said lever is connected to a rod 45.

Referring to Figs. 4 and 5, it will be seen that the pump-piston 9 is an integral continuation of the piston-rod 13, the joint 14 being omitted. The rod 13 is provided with an arm 50, in the outer end of which is adjustably fitted a bracket 51, said arm and bracket being movable with the pump-rod. The forward end of bracket 51 carries a box 52, which has openings in line with the piston-rod 13 for the reception of a measuring-plunger 53. This plunger has a key 54, which slides in the slot 55 to prevent the plunger from rotating. Within the box 52 is an elongated pinion 56, which is internally threaded and mounted on a correspondingly-threaded portion of the plunger 53. The pinion 56 is operated by a sector-gear 57, which is rocked on a pivot or shaft 58 by means of an arm 59, to which is connected the link 44, previously mentioned.

Gasolene is delivered from a chamber 60 through ports 61 to a chamber between the piston 9 and the measuring-plunger 53 while the piston is in its rearmost position. The piston then moves forward, carrying with it the measuring-plunger and a charge of gasolene, which fills the space between them, depending upon the relative position of the measuring-plunger, and therefore upon the position of the sector 57. At the forward end of the stroke of the piston the charge of gasolene is delivered to the air-pipe 12, leading to the mixer through ports 62. By the mechanism just described each charge of gasolene is accurately measured, being greater or less, according to requirements, and being absolutely under the control of the motorman, who by shifting the rod 45 can admit more or less, as desired.

It will be obvious that various changes in details of construction and arrangement may be made in the apparatus herein described without departing from the spirit of my invention. Therefore, without limiting myself to the precise construction and arrangement shown and described,

I claim—

1. In a hydrocarbon-engine for motor-vehicles, the combination with a cylinder and mixing-chamber, of a pump discharging into the mixing-chamber and having a measuring-chamber for the fluid, a valve for controlling the admission of mixture to the cylinder, a stop for limiting the movement of the valve, and means, controllable at will, for simultaneously varying the capacity of the pump and the position of said measuring-chamber and the position of its valve to vary the speed and power of the engine.

2. In a hydrocarbon-engine for motor-vehicles, the combination with a cylinder and mixing-chamber, of a pump discharging into the mixing-chamber, a valve controlling the admission of mixture to the cylinder, a stop mounted on and movable longitudinally of the stem of said valve to regulate the extent of movement thereof, and means, controllable at will, for simultaneously varying the volume of the charge of fluid delivered by the pump to the mixing-chamber and moving said stop longitudinally of the valve-stem, whereby the amount of fluid admitted to the mixing-chamber is properly proportioned to the amount of mixture admitted to the cylinder.

3. In a hydrocarbon-engine for motor-vehicles, the combination with a cylinder and a mixer, of a pump discharging into the mixer and having a longitudinally-extensible piston, a valve controlling the admission of mixture to the cylinder, a stop connected with the valve for limiting its opening movement, and means, controllable at will, for simultaneously varying the length of the pump-piston and adjusting said stop relatively to the valve, to vary the speed and power of the engine.

4. In a hydrocarbon-engine for motor-vehicles, the combination with a cylinder and a mixing-chamber, of a pump discharging into the mixing-chamber and having a piston comprising two members whose adjacent ends are threaded and connected by an interiorly-threaded sleeve, a pinion secured to one of the piston-sections, a valve for controlling the admission of mixture to the cylinder, a stop adjustably secured to the valve-stem for limiting the opening movement thereof, and gearing, controllable at will, adapted to simultaneously rotate the pinion on the pump-piston, to vary the length of said piston, and to move the stop longitudinally of said valve-stem, to vary the speed and power of the engine.

5. In a hydrocarbon-engine for motor-vehicles, the combination with a cylinder, of an inlet-valve therefor having a threaded valve-stem, an abutment adjacent the cylinder, and an internally-threaded stop fitted to and adjustable longitudinally of the valve-stem and adapted to contact with said abutment to limit the opening of the valve, for the purpose set forth.

6. In a hydrocarbon-engine for motor-vehicles, the combination with a cylinder, of an inlet-valve having a threaded stem, an internally-threaded pinion on said stem, a gear engaging said pinion, a stop for said pinion, and means for adjusting the gear, for the purpose set forth.

7. In a hydrocarbon-engine for motor-vehicles, the combination with the mixer, the pump discharging into the mixer, the elongated pinion, and the sector-gear for regulating the discharge of the pump, of the cylinder, the inlet-valve for the cylinder, the elongated pinion and sector-gear for regulating the opening of the inlet-valve, the stop for said latter pinion, and the connection between said sector-gears whereby they are simultaneously operated, for the purpose set forth.

In testimony whereof I affix my signature in presence of two witnesses.

WILLIAM A. HATCHER.

Witnesses:
J. W. PACKARD,
ROBT. E. GORTON.